United States Patent [19]

Van Erden

[11] Patent Number: 4,808,099

[45] Date of Patent: Feb. 28, 1989

[54] APPARATUS FOR MAKING TUBULAR FILM WITH TRANSVERSE CLOSURE STRIPS

[75] Inventor: Donald L. Van Erden, Wildwood, Ill.

[73] Assignee: Minigrip, Inc., Orangeburg, N.Y.

[21] Appl. No.: 74,704

[22] Filed: Jul. 17, 1987

Related U.S. Application Data

[62] Division of Ser. No. 799,828, Nov. 20, 1985, Pat. No. 4,701,361.

[51] Int. Cl.[4] .................. B29C 47/24; B29C 53/20
[52] U.S. Cl. .................. 425/72.1; 156/244.15; 264/151; 264/209.2; 264/209.3; 425/302.1; 425/325
[58] Field of Search .............. 425/72 R, 71, 325, 327, 425/302.1, 393; 264/151, 209.2, 209.3; 428/36, 112; 383/63; 493/214, 215; 138/118.1; 156/66, 244.15

[56] References Cited

U.S. PATENT DOCUMENTS

| | | | |
|---|---|---|---|
| Re. 29,208 | 5/1977 | Naito | 425/327 X |
| 3,180,909 | 4/1965 | Looser | 264/209.2 X |
| 3,231,651 | 1/1966 | Cheney | 264/146 |
| 3,308,220 | 3/1967 | Smith | 264/167 |
| 3,313,870 | 4/1967 | Yazawa | 264/151 X |
| 3,342,657 | 9/1967 | Dyer | 156/163 |
| 3,532,571 | 10/1970 | Ausnit | 156/91 |
| 3,539,669 | 11/1970 | Chein-Ho | 425/72 R X |
| 3,589,958 | 6/1971 | Schrenk | 156/74 |
| 3,661,482 | 5/1972 | Brown, Jr. | 425/72 R X |
| 3,674,898 | 7/1972 | Larsen | 264/146 |
| 3,947,170 | 3/1976 | Zimmermann | 425/72 R |
| 3,948,705 | 4/1976 | Ausnit | 383/63 X |
| 4,049,768 | 9/1977 | Luthra | 264/209.3 X |
| 4,138,453 | 2/1979 | Segl, Jr. | 425/72 R X |
| 4,277,241 | 7/1981 | Schulze | 156/257 X |
| 4,355,494 | 10/1982 | Tilman | 493/214 X |
| 4,450,131 | 5/1984 | Martinek | 264/209.2 |
| 4,540,537 | 9/1985 | Kamp | 156/66 X |
| 4,562,101 | 12/1985 | Andra et al. | 138/118.1 X |
| 4,601,694 | 7/1986 | Ausnit | 493/214 X |
| 4,617,683 | 10/1986 | Christoff | 383/63 |
| 4,629,524 | 12/1986 | Ausnit | 493/215 X |
| 4,655,862 | 4/1987 | Christoff et al. | 383/63 X |
| 4,691,372 | 9/1987 | Van Erden | 493/214 X |
| 4,698,274 | 10/1987 | Ausnit et al. | 428/36 |
| 4,701,361 | 10/1987 | Van Erden | 428/36 |
| 4,703,518 | 10/1987 | Ausnit | 156/66 X |
| 4,736,450 | 4/1988 | Van Erden et al. | 156/66 X |
| 4,736,496 | 4/1988 | Fisher et al. | 383/63 X |

FOREIGN PATENT DOCUMENTS 1423849 11/1965 France ............... 383/63

Primary Examiner—Richard L. Chiesa
Attorney, Agent, or Firm—Hill, Van Santen, Steadman & Simpson

[57] ABSTRACT

An apparatus for making extruded film tube having joined to its inside surface a closure strip extending generally transversely, preferably helically, relative to the axis of the tube and the tube and closure strip being adapted to be converted into a ribbon sheet form with the closure strip extending as individual closure strip sections across the ribbon sheet form at longitudinally spaced intervals, and adapted for making bags.

15 Claims, 1 Drawing Sheet

APPARATUS FOR MAKING TUBULAR FILM WITH TRANSVERSE CLOSURE STRIPS

This is a division of application Ser. No. 799,828, filed Nov. 20, 1985, now U.S. Pat. No. 4,701,361.

BACKGROUND OF THE INVENTION

This invention relates to an apparatus for making tubular film with transverse closure strips for bag making purposes.

Heretofore it has been conventional to produce plastic bag making material from extruded or cast film, provided integrally with or having attached thereto extruded reclosable fastener strip means extending longitudinally parallel to the extrusion axis of the film. A prior art example along this line is found in U.S. Pat. No. Re. 29,208 which discloses the integral tubular extrusion of the film, and longitudinally extending separable fastener means on the inside of the tube.

Attachment of separately formed separable closure means longitudinally to a tubular film is exemplified in U.S. Pat. No. 3,532,571.

Recently it has been proposed, in copending application of Paul B. Christoff and Steven Ausnit, Ser. No. 837,161 filed Mar. 7, 1986, now U.S. Pat. No. 4,655,862 to provide a method of apparatus for providing bag making film onto which separately formed fastener strips are attached in crosswise, i.e. perpendicular position, relative to the formation axis or length of the film. While this structure has advantageous capabilities, such for example as for use in a vertical bag forming, filling and sealing machine, production costs for making the material may be relatively high.

SUMMARY OF THE INVENTION

An important object of the present invention is to provide apparatus for producing a low cost, competitve plastic bag making film material produced in continuous lengths with fastener strips, which may be integrally extruded therewith, extending thereacross.

Another object of this invention is to provide new and improved apparatus for producing tubular extruded bag making material carrying fastener strip means extending across the direction of extrusion of the material.

A further object of this invention, is to provide a new and improved apparatus for producing continuous length extruded plastic bag material having fastener strip means across the length of the plastic film.

Yet another object of this invention, is to provide new and improved apparatus for producing continuous length plastic bag making film with transversely extending separable fastener strip means.

Pursuant to the principles of the present invention, there is provided apparatus for producing plastic film with transverse closure strips and especially adapted for making bags. The apparatus comprises means for continuously extruding and running a plastic film tube along a given longitudinal axis, means for joining with a surface of the tube closure strip means having a longitudinal strip axis still extending across the tube axis as persisting in the ribbon sheet form extending generally transversely relative to the tube axis, and means for converting the tubular film into ribbon sheet form with the closure strip means extending as individual closure strips across the ribbon sheet form at longitudinally spaced intervals.

BRIEF DESCRIPTION OF THE DRAWINGS

Other objects, features and advantages of the invention will be readily apparent from the following description of representative embodiments thereof, taken in conjunction with the accompanying drawing, although variations and modifications may be effected without departing from the spirit and scope of the novel concepts embodied in the disclosure, and in which.

DETAILED DESCRIPTION

Figure 1:
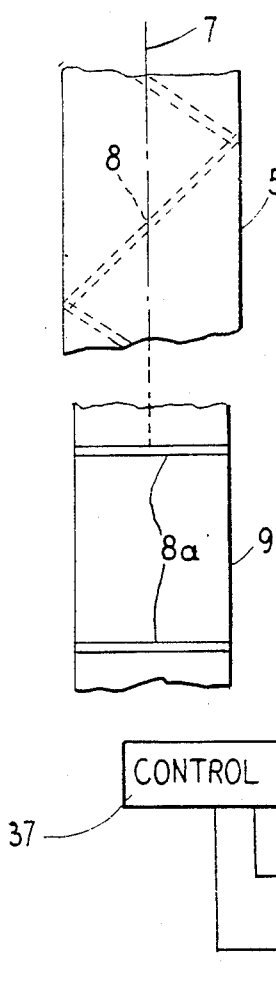
FIG. 1 is a schematic illustration of tubular plastic film especially adapted for making bags with transverse closure strips, and demonstrating how the material is converted from tubular form into ribbon sheet form.
Figure 2:
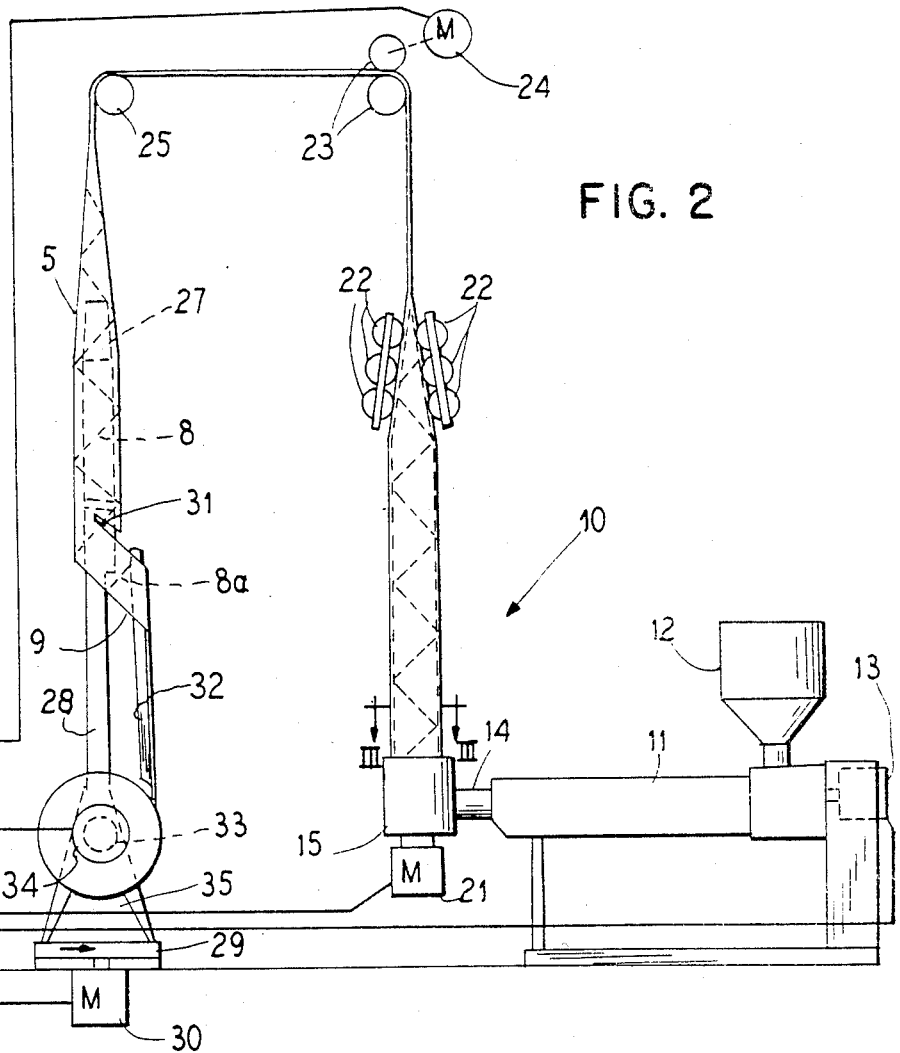
FIG. 2 is a schematic illustration of apparatus for practicing a method of producing the closure strip equipped plastic film.

As represented in FIGS. 1 and 2, a continuously extruded plastic film tube 5, having a longitudinal axis 7, has closure strip means 8 joined to the inside surface of the tube and extending generally transversely, in this instance helically, about to the axis 7. The plastic film tube 5 is convertible into ribbon sheet form 9, with the closure strip means extending as individual closure strips 8a across the ribbon sheet form 9 at longitudinally spaced intervals.

In apparatus 10 (FIG. 2) for practicing a method of making the plastic film, any preferred known extruder 11, which may have a supply hopper 12 and a drive motor 13, extrudes molten, thermoplastic, plastic material through a nozzle 14 into an extrusion die structure 15. The plastic material may be selected from those synthetic resins customarily used for this purpose, such as low or high density polyethylene, polyvinylcholoride, and the like.

Figure 3:
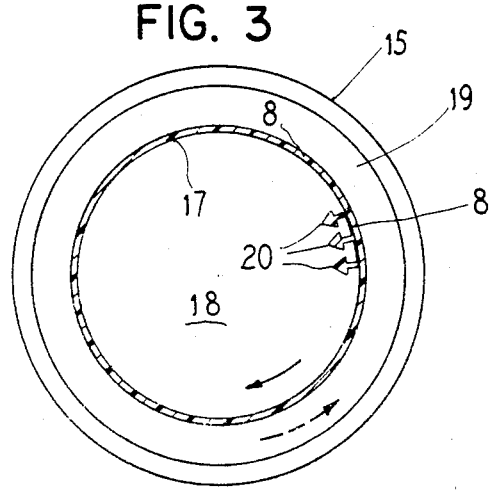
FIG. 3 is an enlarged fragmentary detail view taken substantially along the line III—III in FIG. 2.

The molten plastic is extruded upwardly in this instance through an orifice 17, (FIG. 3), which has means for not only forming the tubular film 5, but also the closure strip means 8. For this purpose, the die structure comprises an inner circular die member 18 and an outer circular die member 19, between which the orifice 17 is defined.

In addition, the inner die member has orifice configuration for continuously extruding the closure strip means 8 which, as shown, is of the multi-profile form having three interlockable profiles 20, although there may be less or more of such profiles as desired.

The arrangement and operation of the die structure is desirably such that at least the inner die member 18 is rotatably operated for joining the closure strip means 8 with the inside of the tube 5 in uniformly spiral fashion. Means such as a motor 21 may be rotatably provided for driving the die member 18 in properly coordinated relation with operation of the extruder 11 to effect the uniform spiral form of the closure strip means as the tube 5 is continuously extruded. Although the outer die member 19 may be stationary, if preferred it may also be rotatably driven, but in the opposite rotary direction from the inner die member 18. Where the outer die member is rotatable, the closure strip extrusion orifices may be in the outer die member. As is common practice, air may be injected into the freshly extruded tube 5 for properly maintaining its tubular shape and for cooling the tube and the closure strip means 8 to a substantially cured state.

When the unitary plastic assembly 5,8 is thoroughly self-sustaining, means such as collapsing rollers 22 flatten the tube which passes through driving pinch rolls 23 that are driven by means such as a motor 24 synchronized in operation with the motors 13 and 21. From the rolls 23, the flattened plastic assembly passes over guide means such as idler roller 25 and travels downwardly over a spreader mandrel 27, which is mounted for rotation about its axis on supporting bracket or frame means 20 mounted on a rotary stand or turntable 29 driven rotatably as by means of a motor 30 coordinated in operation with the other driving means of the system so that a rotary knife 31 at the lower end of the mandrel 27 will cut the onwardly travelling tubular film 5 continuously on the bias to convert the same into the ribbon sheet form 9. As shown, the knife 31 is so oriented relative to the onwardly travelling tube 5 that it will cut at right angles across the closure strip means 8 and while cutting the tube 5 into a film ribbon sheet width of the desired dimension for making bags of predetermined width from the ribbon sheet.

Although the ribbon sheet 9 may be directed immediately to a bag forming apparatus, or even a bag forming and filling apparatus, the ribbon sheet form 9 may be, as shown, directed by guide means 32 onto a reel 33 which may be driven for windup by means such as a motor 34, and is mounted as by means of a bracket 35 on the turntable 29 for synchronized rotation with the knife 31.

Desirably, all of the motors are controlled for coordinated operation through a control means 37.

Figure 4:
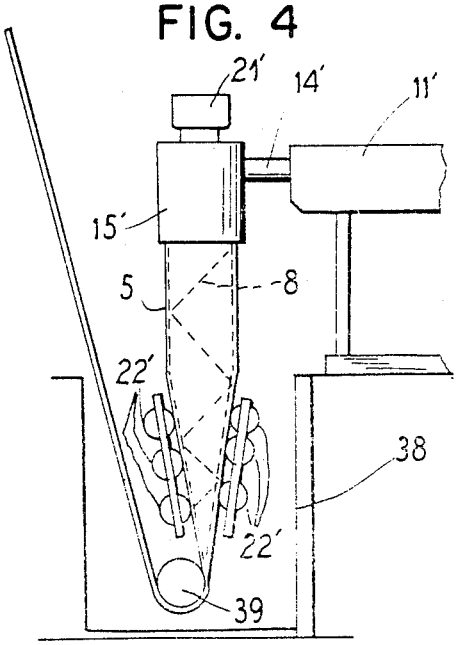
FIG. 4 is a fragmentary schematic view showing a modification in the apparatus.

If in addition to or instead of air cooling of the continuously extruded plastic film tube 5, it is desired to water chill the same, the arrangement shown in FIG. 4 may be employed. For this purpose, the extruder 11' extrudes the molten plastic through a nozzle 14' into the extrusion die assembly 15' wherein at least the central rotary orifice die member is driven by the motor 21'. The extruded film tube carrying the closure strip means 8 spirally on its inner surface is directed downwardly into a water-filled chilling tank 38 wherein the tube is collapsed by the collapsing roll assembly 22' and the collapsed tube is then trained over an idler guide roller 39 and travels generally upwardly to complete the cycle of operation substantially the same as described in connection with FIG. 2 where the tube passes on over and is driven through the pinch rolls 23, and so on, to completion of the operation.

It will be understood that variations and modifications may be effected without departing from the spirit and scope of the novel concepts of the present invention.

I claim as my invention:

1. Apparatus for producing plastic film with transverse closure strips and especially adapted for making bags, comprising:
    means for continuously extruding and running plastic film tube along a given longitudinal axis;
    means for joining with a surface of said tube closure profiled strip means extending generally transversely relative to said axis wherein said joining means is part of said extruding means and effects extrusion of said closure strip means simultaneously with the plastic film tube and from the same plastic material;
    and means for converting said plastic film tube into ribbon sheet form with said closure strip means extending as individual closure strips across the ribbon sheet form at longitudinally spaced intervals.

2. Apparatus according to claim 1, wherein said joining means causes the closure strip means to extend continuously helically inside the tube.

3. Apparatus according to claim 1, wherein said extruding means forms a plurality of interlockable profiles on said closure strip means.

4. Apparatus according to claim 1, wherein said joining means causes said closure strip means to be joined integrally in one piece with the plastic film tube.

5. Apparatus according to claim 1, wherein said extruding means comprises a rotary die for extruding said closure strip means.

6. Apparatus according to claim 1, wherein said converting means comprises a cutter which severs the tube into said film ribbon strip and severs across said closure strip means.

7. Apparatus according to claim 1, comprising means for chilling said tube and said closure strip means, means for collapsing and continuously driving the tube, means for expanding the tube, and means for cutting the tube on the bias and across said closure strip means for effecting the converting into the ribbon sheet form, and means for winding the ribbon sheet form into a roll.

8. Apparatus for producing plastic film with transverse closure strips and especially adapted for making bags, comprising:
    means for continuously extruding and running a plastic film tube along a given longitudinal axis;
    means for joining with a surface of said tube a closure strip means having a longitudinal strip extending generally transversely relative to said tube axis wherein said joining means is part of said extruding means and effects extrusion of said closure strip means simultaneously with the plastic film tube and from the same plastic material; and
    means for converting said tubular film into ribbon sheet form with said closure strip means extending as individual closure strips across the ribbon sheet form at longitudinally spaced intervals and thereby extending across the longitudinal tube axis which persists in the ribbon sheet form.

9. Apparatus according to claim 8, wherein said means for converting comprises a mandrel with a rotary knife.

10. Apparatus according to claim 9, including means for rotatably driving said mandrel.

11. Apparatus according to claim 10, including means for guiding said ribbon sheet form from the mandrel, and a rotary reel receiving the sheet from said guiding means.

12. Apparatus according to claim 8, including means for receiving and reeling said ribbon sheet form.

13. Apparatus according to claim 8, wherein said longitudinal tube axis extends upwardly, means for diverting said tube and the joined strip in a generally horizontal direction and then downwardly, and said converting means including an upwardly extending mandrel receiving said tubular film with the joined closure strip means thereon running downwardly, and a knife cooperating with the mandrel in severing said tubular film into said ribbon sheet form.

14. Apparatus according to claim 8, wherein said longitudinal tube axis extends downwardly, said converting means includes an upwardly extending mandrel, and means for guiding said tubular film from the lower end of said longitudinal tube axis to the top of said mandre.

15. Apparatus according to claim 14, including means for running said tubular film downwardly along said mandrel, and a knife for slitting said tubular film into said ribbon sheet form.

* * * * *